United States Patent [19]

Mackowsky

[11] Patent Number: 5,738,569
[45] Date of Patent: Apr. 14, 1998

[54] THREADED GRINDING WHEEL, AND METHOD OF DRESSING

[75] Inventor: Roman Mackowsky, East Brunswick, N.J.

[73] Assignee: The Gleason Works, Rochester, N.Y.

[21] Appl. No.: 688,341

[22] Filed: Jul. 30, 1996

Related U.S. Application Data

[62] Division of Ser. No. 214,885, Mar. 16, 1994, Pat. No. 5,573,449.

[51] Int. Cl.$^6$ ...................................................... B24B 53/06
[52] U.S. Cl. ............................. 451/56; 451/324; 451/443; 451/547
[58] Field of Search ........................... 451/28, 47, 56, 451/324, 443, 541, 544, 547

[56] References Cited

U.S. PATENT DOCUMENTS

| | | |
|---|---|---|
| 2,385,650 | 9/1945 | Rickenmann . |
| 2,792,824 | 5/1957 | Rickenmann . |
| 2,893,173 | 7/1959 | Bateman . |
| 2,907,314 | 10/1959 | Osplack . |
| 3,152,422 | 10/1964 | Loxham . |
| 3,568,655 | 3/1971 | Deakin et al. . |
| 3,602,209 | 8/1971 | Bocker . |
| 3,740,904 | 6/1973 | Ainoura . |
| 3,763,598 | 10/1973 | Hofler . |
| 4,393,625 | 7/1983 | Bloch et al. . |
| 4,475,319 | 10/1984 | Wirz . |
| 4,617,761 | 10/1986 | Miyatake et al. . |
| 4,744,179 | 5/1988 | Mockli . |
| 4,850,155 | 7/1989 | Sulzer ............................. 51/287 |
| 5,174,699 | 12/1992 | Faulstich . |
| 5,175,962 | 1/1993 | Pedersen . |
| 5,209,020 | 5/1993 | Feisel . |
| 5,289,815 | 3/1994 | Krenzer . |

FOREIGN PATENT DOCUMENTS

| | | |
|---|---|---|
| 0417050 | 10/1994 | European Pat. Off. . |
| 40478 | 7/1932 | France . |

OTHER PUBLICATIONS

Hoglund Corporation brochure, "CNC Dressing System for the Reishauer Gear Grinders", 1989.

Mikron brochure, "CNC Gear Grinder—G 300 CNC", Jun. 1993.

NUM brochure, "NUM 750/760 MX, Appendix to Programming Handbook 750/760 F", pp. 5.7–5.11, Feb. 1989.

*Primary Examiner*—Eileen P. Morgan
*Attorney, Agent, or Firm*—Robert L. McDowell; Ralph E. Harper

[57] ABSTRACT

A method of dressing a threaded grinding wheel comprising rotating the grinding wheel and dressing tool about their respective axes and bringing the tool into contact with a point on a flank of the grinding thread. The dressing tool is traversed along the width of the grinding wheel with the dressing tool maintaining contact with the point during the traversing to remove stock material at the point on the flank along the width of the grinding wheel. The method includes controlling the amount of stock material removed by the dressing tool during the traversing at the point whereby different amounts of stock may be removed in different axial sections along the grinding wheel width at the point thus varying the grinding profile at each section at the point of contact. The tool is traversed at successive points along the grinding thread profile to produce a different grinding profile at each section of the grinding wheel. A method of grinding spur and helical gears is also disclosed.

19 Claims, 4 Drawing Sheets

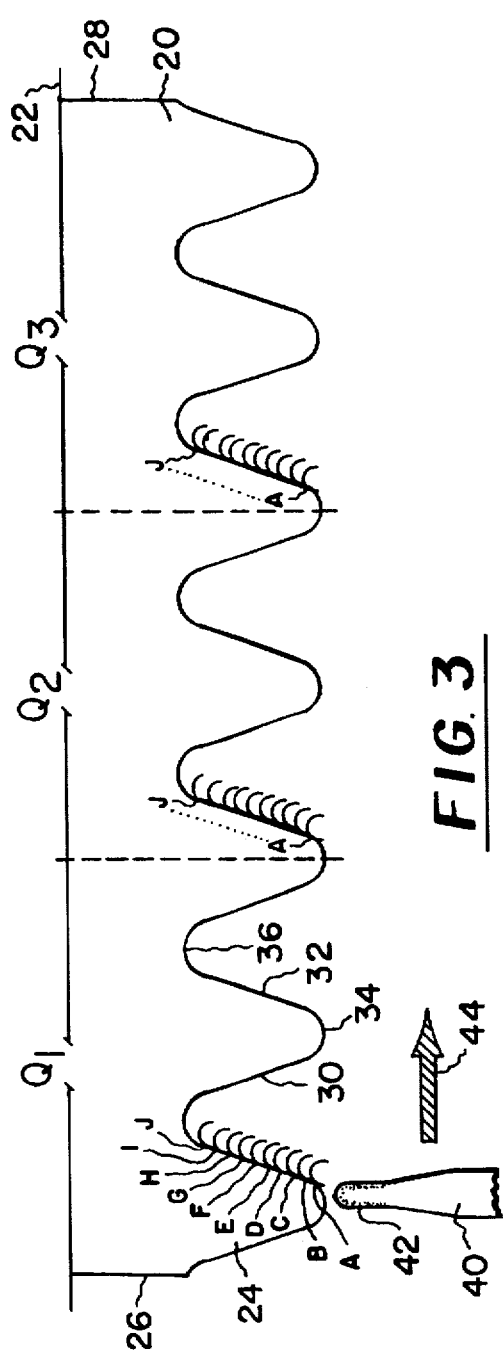
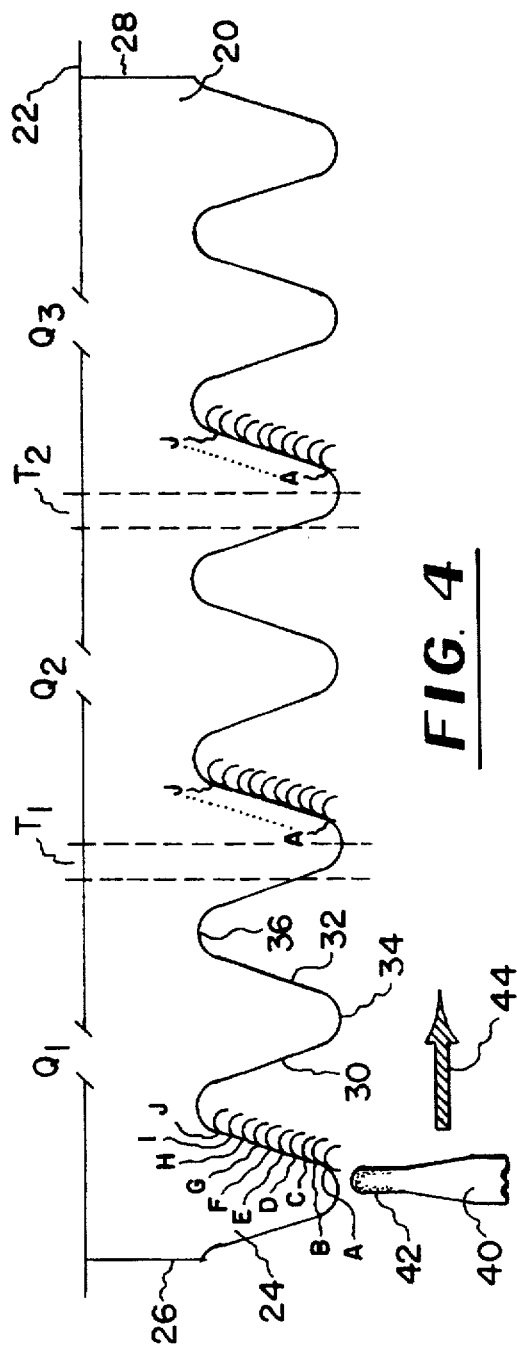
FIG. 3
FIG. 4

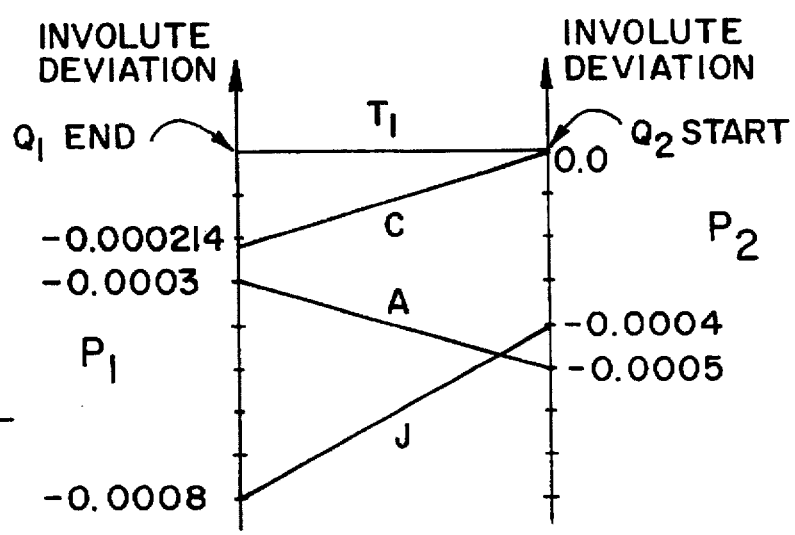
*FIG. 5*
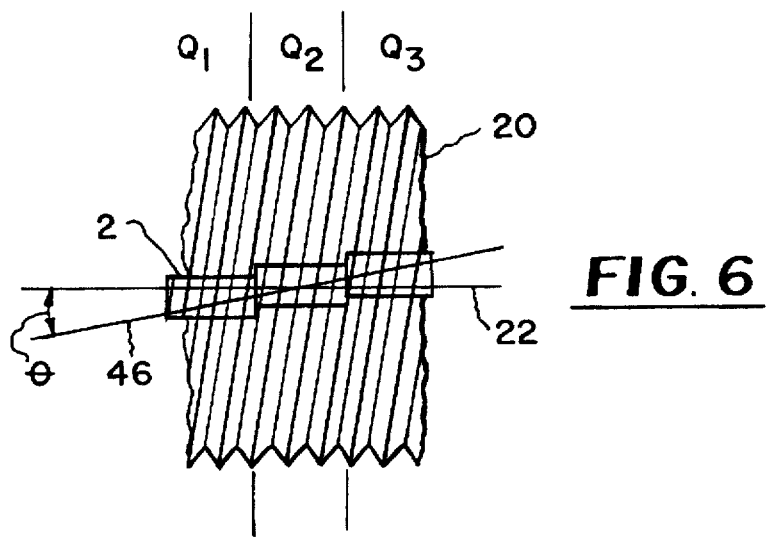
*FIG. 6*
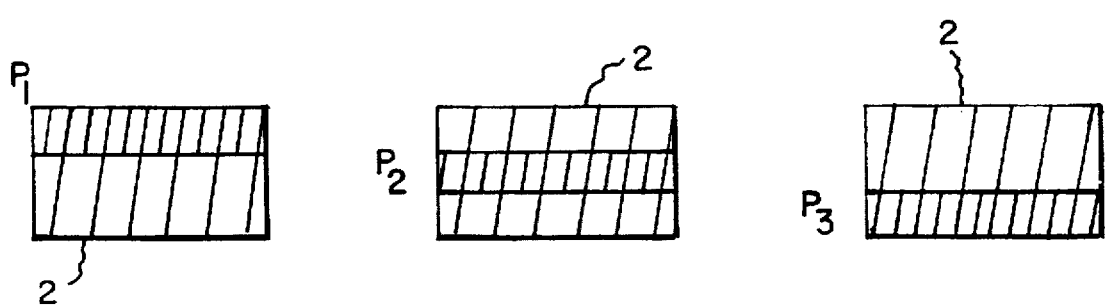
*FIG. 7(A)*    *FIG. 7(B)*    *FIG. 7(C)*

THREADED GRINDING WHEEL, AND METHOD OF DRESSING

This is a divisional of application Ser. No. 08/214,885 filed Mar. 16, 1994, now U.S. Pat. No. 5,573,449.

FIELD OF THE INVENTION

The present invention pertains to the dressing of grinding wheels and grinding workpieces with the dressed grinding wheels. Particularly, the present invention relates to dressing of threaded grinding wheels and grinding spur and helical gears with threaded grinding wheels.

BACKGROUND OF THE INVENTION

Grinding spur and helical gears with a threaded grinding wheel is well known in gear manufacture. Equally well known is the need to periodically dress the grinding wheel, usually with a diamond tool, to remove dull abrasive grains, clear the chip-loaded surface of the grinding wheel, or, shape the grinding wheel to a specific profile in order to generate a desired work gear tooth profile.

One example of dressing a threaded grinding wheel to provide a specific grinding profile is shown in U.S. Pat. No. 2,792,824 to Rickenmann. The disclosed method utilizes a pair of diamond dressing tools which are traversed in multiple passes across the width of a threaded grinding wheel in a direction parallel to the wheel axis. Prior to each traversal, the tools are stepwise adjusted along the grinding wheel flanks to reposition the tool for the next dressing pass.

In dressing a grinding wheel for grinding involute gear tooth profiles according to U.S. Pat. No. 2,792,824, a straight line flank profile is most commonly dressed into the grinding thread of the wheel to produce an involute tooth profile on the work gear. However, in those instances where a non-involute gear profile is to be ground, modifications to the grinding wheel straight line flank are included in the dressing process. Templates are used to cause the diamond tools to deviate from the straight-line flank dressing on the grinding wheel. The modified thread or rib is dressed completely along the wheel width. Therefore, the same flank profile form appears along the entire length of the grinding thread thus forming the same profile shape along the entire length of the tooth being ground.

Dressing a threaded grinding wheel along its line of action is disclosed by U.S. Pat. No. 2,907,314 to Osplack. The dressing tool traverses in multiple passes along the line of action of the rack form of a rotating grinding wheel. The tool is incrementally adjusted in a direction perpendicular to the line of action prior to each pass so as to reposition the tool for the following traversal.

There are situations where it is desirable to manufacture a gear having a modified tooth form which deviates from a true involute, such as when deflection must be taken into account due to heavy operating loads. One or both flanks of a tooth may be modified depending on the direction of rotation of the gear. Osplack teaches modifying the flanks of the grinding wheel to effect changes in the tooth flanks of a work gear wherein a roller and cam surface are used to control the amount a dressing tool deviates from a straight-line grinding profile.

As with the previous teaching in U.S. Pat. No. 2,792,824, modifications introduced into the grinding thread profile by the method of U.S. Pat. No. 2,907,314 extend along the entire length of the grinding thread. Therefore, any subsequent modification formed in the tooth profile will be formed along the entire length of the tooth.

U.S. Pat. No. 3,568,655 to Deakin et al. discloses yet another manner wherein flank variation is introduced in a threaded grinding wheel. As slides are moved to reposition the dressing tools for a dressing pass, a plate (mounted on one or both of the slides) having a cam surface engages a lever to control small lateral movements of the dressing tool in the direction of the grinding wheel axis. The small movements represent deviations from a straight-line grinding profile and produce variations from a true involute along the entire length of the tooth flanks of a work gear.

However, all of the dressing methods discussed above introduce a uniform profile change along the entire length of the grinding thread and hence, create a uniformly modified tooth profile along the entire length of a gear tooth. It has not been possible to differentially modify a tooth profile along the tooth length even though conditions, such as load and wear, are not constant along the gear tooth length.

It is an object of the present invention to afford better control of the surface topography of a gear tooth by controlling the profile shape at different locations along the length of the gear tooth.

It is another object of the present invention to provide a novel method of dressing a threaded grinding wheel whereby multiple tooth profile regions may be formed along the tooth length of a gear to be ground by the dressed grinding wheel.

SUMMARY OF THE INVENTION

The present invention is directed to a method of dressing a threaded grinding wheel having an axis of rotation, a width extending in the direction of the axis of rotation, and at least one thread-like grinding surface having two flank surfaces, a top surface and a root portion. The thread-like grinding surface is generally helically arranged about the grinding wheel and extends along the width.

The method comprises assigning a predetermined number of axial sections along the width of the grinding wheel with the number of axial sections corresponding to a like number of desired profile surfaces arranged across the face of a gear tooth to be ground by the dressed threaded grinding wheel.

The grinding wheel is rotated about its axis of rotation and a rotating dressing tool is brought into contact with a point on a flank of one of the two flank surfaces of the grinding thread. The dressing tool is then traversed through the axial sections along the width of the grinding wheel with the dressing tool maintaining contact at the contact point during the traversing to remove stock material at the point on the flank along the length of the grinding thread.

The dressing method includes controlling the amount of stock material removed by the dressing tool during the traversing at the contact point in each of the axial sections of the grinding wheel whereby different amounts of stock may be removed in each axial section at the point thus varying the grinding profile in each section at the specific point.

After the dressing tool has traversed the width of the grinding wheel, the dressing tool is brought into contact with the next successive point on the grinding flank and the dressing tool is again traversed across the width while being controlled in each axial section to remove a desired amount of stock material in each particular section at its contact point. The steps of contacting, traversing and controlling are repeated for each successive contact point along the flank of the grinding thread whereby a particular grinding flank profile surface is formed in each of the axial sections of the grinding wheel.

At the completion of dressing one flank of the grinding wheel, the steps of contacting, traversing and controlling are repeated for the other grinding flank.

Alternatively, the dressing tool may be traversed across the width of the rotating grinding wheel at a contact point on one of the grinding flanks, the direction of rotation of the grinding wheel may then be reversed and dressing at a contact point on the other grinding flank may proceed by traversing the dressing tool in a direction opposite to that of the first flank. The grinding wheel rotation is then reversed and the procedure is repeated as many times as there are points of contact on the flanks of the grinding wheel.

The present invention also includes a method of grinding spur and helical gears with a grinding wheel dressed or manufactured in accordance with the grinding wheel profiling method discussed above.

The grinding wheel comprises a plurality of grinding sections arranged along its width with each of the sections having a particular grinding profile formed on the flanks of the grinding thread surface in the respective section. In addition to the grinding wheel being a dressable type formed by the dressing method discussed above, the grinding wheel may also be of the non-dressable type with a grinding thread in accordance with the present invention.

The grinding wheel and a work gear are rotated in a synchronous manner and the work gear is traversed tangentially across the width of the grinding wheel at an angle to the axis of rotation of the grinding wheel whereby contact between the grinding surface and the tooth surface of the work gear shifts along the length of the tooth surface during the traversing.

The shifting of contact allows successive portions along the tooth surface length to be ground, respectively, by a different grinding profile as the work gear is traversed through each axial section of the grinding wheel. The resulting tooth surfaces therefore comprise a plurality of flank profile surfaces arranged along the length of the tooth surfaces. The number of the flank profile surfaces on the work gear tooth surface is equal to the number of axial grinding sections on the grinding wheel.

BRIEF DESCRIPTION OF THE DRAWINGS

FIG. 3 shows a cross-section of threaded grinding wheel and a method of dressing the grinding wheel according to the present invention.

FIG. 4 shows a cross-section of a grinding wheel according to the present invention including transition zones between the grinding sections.

FIG. 5 illustrates the transition between points in one grinding section to corresponding points in an adjacent grinding section.

FIG. 6 illustrates traversing a work gear across a grinding wheel in accordance with the present invention.

FIGS. 7a, 7b, and 7c show different flank profile areas on a work gear ground by the method of FIG. 6.

DETAILED DESCRIPTION OF THE PREFERRED EMBODIMENTS

The present invention will now be described with reference to the accompanying Figures.

Figure 1:
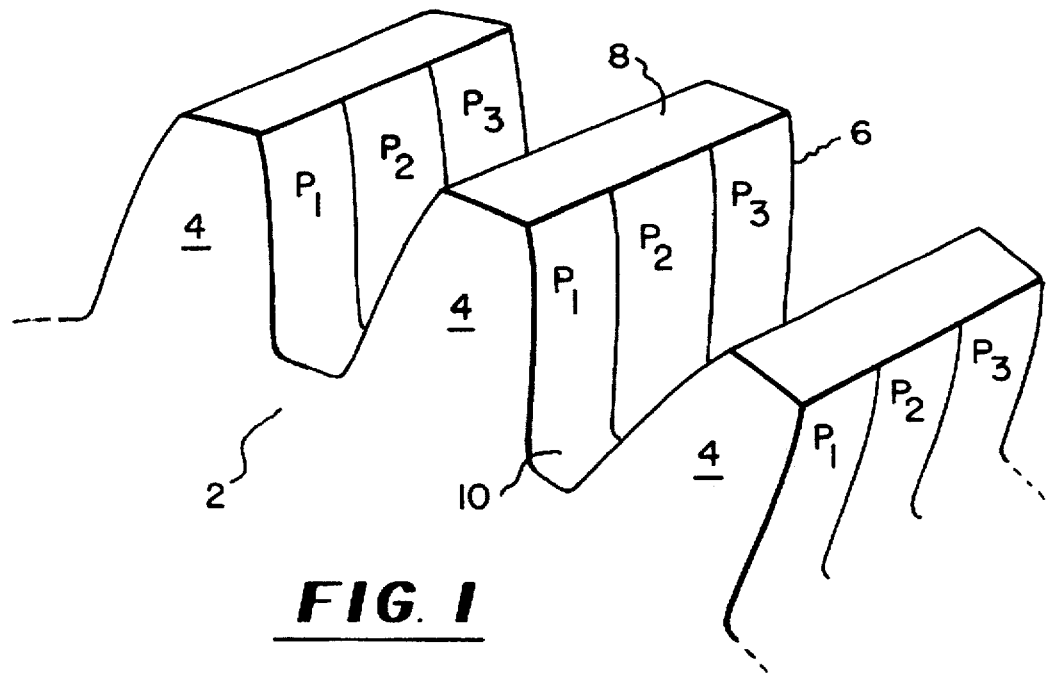
FIG. 1 illustrates a work gear having different flank profiles formed by the grinding method of the present invention.

FIG. 1 illustrates a partial view of a gear 2 having teeth 4. Each tooth 4 has a pair of tooth surfaces one of which is shown at 6, and a top surface 8. Between successive teeth 4 is a root portion 10.

The present invention provides for the formation of a plurality of profile deviations arranged along the length of the tooth surface in a spur or helical work gear. The gear in FIG. 1 comprises three such profile deviations labeled $P_1$, $P_2$, and $P_3$. It is to be understood that the number of profile deviations is not limited to three but that any number of desired profile deviations (Within the practical limits of the grinding wheel dressing mechanism) may be arranged along the tooth surface length.

Figure 2:
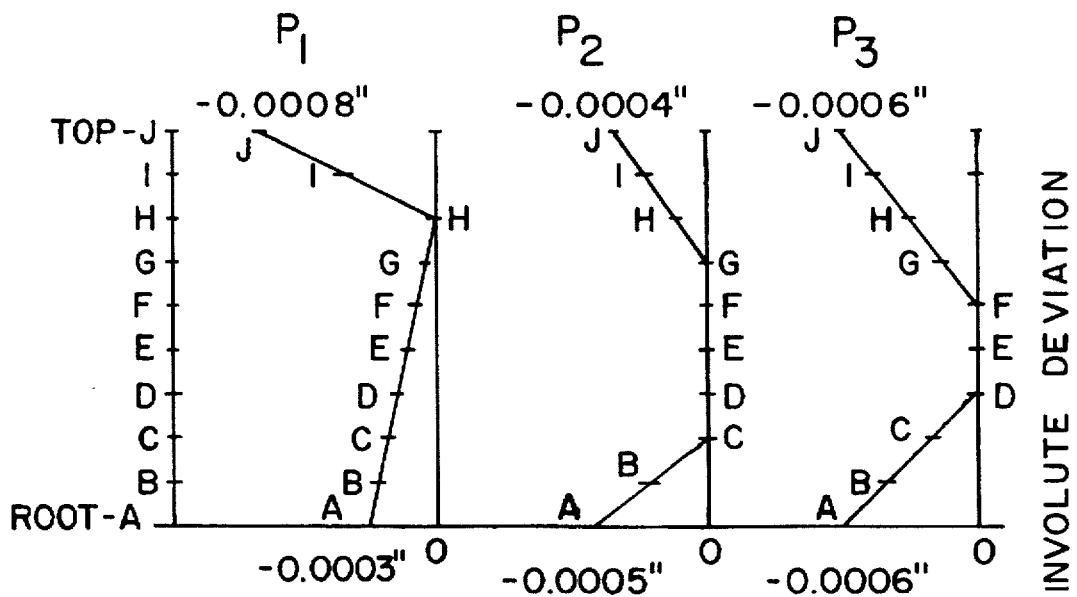
FIG. 2 illustrates profile inspection charts for the flank profiles of FIG. 1.

FIG. 2 graphically represents an example of profile inspection charts of three profile deviations arranged along the length of a work gear tooth such as shown in FIG. 1. The vertical lines labeled zero "0" represent a true involute tooth flank profile form and the letters A–J represent ten points located along the flank profile from the root 10 to the top 8 of the tooth 4. Although ten points along the tooth flank have been selected, the present invention is not limited thereto. Any number of points may be chosen to describe the desired flank profile surface.

It can be seen in FIG. 2 that section $P_1$ describes a surface which departs from an involute by an amount of −0.0003 inch (−0.00762 mm) at point A near the root 10. The profile of the desired surface in section $P_1$ gradually approaches an involute up to point H where it is coincident with an involute surface. From point H the flank profile again departs from an involute to point J at top 8 where it is −0.0008 inch (−0.02032 mm) relieved from the involute surface.

Section $P_2$ of FIG. 2 describes the desired flank profile surface in the center portion of the tooth length of the gear in FIG. 1. At point A near root portion 10, the surface of the flank profile departs from an involute by an amount of −0.0005 inch (−0.01270 mm). However, at points C through G, the curve of the involute is followed and from point G to point J at the top of the tooth profile, the desired tooth flank surface again gradually departs from an involute where at point J the amount of stock removed is −0.0004 inch (−0.01016 mm) more than that needed to form the involute surface.

Looking at the third desired profile flank surface $P_3$ it can be seen that both extreme points of the profile, points A and J, deviate from an involute by the amount of −0.0006 inch (−0.01524 mm). The desired surface approaches that of an involute at points D and F and coincides with an involute between points D and F.

All points shown in FIG. 2 are on the zero "0" line representing a true involute, or, are negative which indicates material in excess of that required for a true involute is to be removed. However, the present invention also contemplates those tooth surfaces requiring positive positions for points along the tooth flanks indicating additional material is to be left on the tooth surface. In situations such as this, less material is removed from the tooth surface than is required to form a true involute tooth surface.

Once the number of flank profile sections are known and identified for a particular work gear, as shown in FIG. 2 for example, a threaded grinding wheel is dressed to produce the required flank profile sections on the teeth of the work gear.

FIG. 3 illustrates a partial cross-section of a threaded grinding wheel 20 comprising an axis of rotation 22 and at least one grinding thread or rib 24 generally helically arranged about the grinding wheel 20 and extending the width of the grinding wheel between ends 26 and 28. The grinding thread 24 includes two grinding flank surfaces 30 and 32, top surface 34, and root portion 36. Top surface 34 and root portion 36 may also be grinding surfaces. The grinding wheel 20 may be of any suitable dressable material such as conventional aluminum oxide, seeded-gel, or vitrified-bond cubic boron nitride (CBN).

The grinding wheel 20 is assigned a number of axial grinding sections corresponding to the number of desired flank profile deviations on the teeth of the work gear. In the case of the grinding wheel of FIG. 3, three sections, $Q_1$, $Q_2$, and $Q_3$, are assigned and correspond respectively to sections $P_1$, $P_2$, and $P_3$ of the gear of FIG. 1. Preferably, the width of each grinding section along the grinding wheel width is proportional to the width of each flank profile section along the tooth length of the gear. However, the width of each grinding section may be determined in any suitable way. The grinding surface profile of each grinding section is different than the grinding surface profile of an adjacent grinding section.

The grinding wheel 20 is dressed by rotating it about the axis of rotation 22 and contacting the flank surfaces 30, 32 of the grinding thread 24 with a rotating dressing tool 40 having a radiused edge surface 42 which preferably is diamond plated. The position of the dressing tool 40 is controlled in each grinding wheel section whereby that section will form the desired flank profile section along the length of the tooth surface on a work gear to be ground by the dressed grinding wheel.

The rotating edge surface 42 is brought into contact with a first point A on one of the grinding flank surfaces at one end of the grinding wheel. In FIG. 3, dressing of flank surface 32 beginning at end 26 is selected for illustration. The dressing tool 40 is traversed across the width of the grinding wheel 20, in the direction of arrow 44, while keeping in contact with the grinding wheel at point A along the entire width.

In grinding wheel section $Q_1$, sufficient stock material is removed from the grinding surface at point A such that point A of work gear tooth length section $P_1$ (FIG. 2) will be formed during the subsequent grinding process. In FIG. 2 it is shown that in tooth section $P_1$, at point A, the tooth surface is to be relieved −0.0003 inch (−0.00762 mm) from an involute surface. This means that since additional stock material is to be removed from the tooth surface at this point, additional stock material must be left on the grinding surface at point A in grinding wheel section $Q_1$.

As the dressing tool traverses along the grinding wheel width at point A and passes from section $Q_1$ into section $Q_2$, the amount of stock removed by the dressing tool at point A is changed so that point A in tooth length section $P_2$ (FIG. 2) will be formed when the work gear is ground.

Dressing continues at point A, progressing along the width from grinding wheel section $Q_2$ into section $Q_3$. The amount of stock material removed from the grinding surface at point A is again changed whereby point A of tooth length section $P_3$ (FIG. 3) will be formed upon grinding of the work gear.

At the end of the dressing traversal at point A on the grinding wheel, the dressing tool may be withdrawn from the grinding wheel and, via a return stroke, moved back to end 26 where the dressing tool is repositioned at point B in section $Q_1$ to form the desired grinding surface necessary to produce point B in section $P_1$ of the work gear tooth length surface. The dressing tool is traversed across the width of the grinding wheel at point B, varying the amount the amount of stock material removed as it passes through wheel sections $Q_2$ and $Q_3$ so that the desired surface at point B of respective work gear sections $P_2$ and $P_3$ may be formed.

The steps outlined above with regard to points A and B are repeated for each remaining point C–J on the grinding wheel profile surface. After the final dressing tool traversal, the grinding surface is completely formed for grinding thread flank 32 with each grinding section $Q_1$, $Q_2$, and $Q_3$ having a specific profile contour such that the desired tooth surface deviations $P_1$, $P_2$, and $P_3$ may be formed along a tooth surface length of the work gear 2.

Preferably, the transition from one grinding section to a successive section will not be abrupt. That is, for example, the dressing tool will not instantly shift from point A in $Q_1$ to point A in $Q_2$ upon entering grinding wheel section $Q_2$ from section $Q_1$. Instead, a gradual transition, preferably linearly, from the point being dressed in one section to the position of the same point in the next section is preferred. The position of the point in the next grinding section should be reached just as the dressing tool enters the next section. Of course, if the location of a point in one section is unchanged in the next adjacent section (such as points D, E, or F in $P_2$ and $P_3$ of FIG. 2) than no transition is necessary for that particular point.

The above-described transition from one grinding section to the next is illustrated in FIG. 4 and FIG. 5. It can be seen in FIG. 4 that transition zones $T_1$ and $T_2$ are located, respectively, between grinding sections $Q_1$ and $Q_2$, and, between sections $Q_2$ and $Q_3$. In these zones, transition occurs in a linear manner from the point being dressed in one grinding section to the point to be dressed in the next grinding section. The width of a transition zone is programmable and may vary depending upon the demands of the application.

FIG. 5 illustrates the transition from grinding section $Q_1$ to section $Q_2$ through transition zone $T_1$. Three points (A, C, and J) have been selected for illustration purposes but the transition applies to all points. In FIG. 5, the left vertical line represents the involute deviation for tooth length portion $P_1$ and the right vertical line represents the involute deviation for tooth length portion $P_2$. The horizontal line represents transition zone $T_1$ extending along the width of the grinding wheel between the end of grinding section $Q_1$ and the start of grinding section $Q_2$.

In section $P_1$ of the work gear (See FIG. 2), point A is relieved −0.0003 inch (−0.00762 mm) from a true involute while point A in work gear tooth portion $P_2$ is relieved −0.0005 inch (−0.01270 mm) from a true involute. It then follows that in order for point A in respective grinding wheel sections $Q_1$ and $Q_2$ to form the desired corresponding point A in $P_1$ and $P_2$, a transition from the dressing tool position at point A in $Q_1$ to the dressing tool position at point A in $Q_2$ must occur. FIG. 5 shows the preferred transition where, in transition zone $T_1$, the dressing tool is repositioned linearly from point A in $Q_1$, which forms point A in $P_1$, to point A in $Q_2$, which forms point A in $P_2$.

Repositioning of the dressing tool in the transition zones by this method effects a smooth transition between grinding sections, $Q_1$, $Q_2$, etc., on the grinding wheel and, therefore, forms a smooth transition between flank deviations, $P_1$, $P_2$, etc., along the length of the work gear teeth. Although a linear transition is preferred, the present invention is not limited thereto as any desired transition path may be followed.

In the same manner as discussed above regarding point A, the dressing tool is repositioned in transition zone $T_1$ for all remaining points of which C and J are illustrated. The dressing tool is repositioned linearly from point C in $Q_1$, which forms point C in $P_1$ located at a −0.000214 inch (−0.00544 mm) deviation from a true involute, to point C in $Q_2$, which forms point C in $P_2$ located on the surface of a true involute (See FIG. 2). For point J, the dressing tool is repositioned linearly from point J in $Q_1$, which forms point J in $P_1$ located at a −0.0008 inch (−0.02032 mm) deviation from a true involute, to point J in $Q_2$, which forms point J in $P_2$ located at a −0.0004 inch (−0.01016 mm) deviation from a true involute.

Dressing of the other grinding surface 30 may also be performed in accordance with the inventive method discussed above with the same or a different number of points along the surface profile being utilized in dressing the grinding profile surface 30.

Alternatively, after a dressing traversal, instead of a return stroke and repositioning of the dressing tool at the next point along the grinding surface profile, the direction of grinding wheel rotation may be reversed and dressing of the other grinding surface flank may proceed in a direction opposite that of the preceding traversal.

For example, after the traversal of the dressing tool across the width of the grinding wheel (in the direction of arrow 44) at point A on flank 32, instead of a return stroke to end 26 and repositioning to point B on flank 32, the direction of rotation of the grinding wheel may be reversed and a point on the other flank 30 may be dressed with the direction of traversal being opposite that of arrow 44. Of course it can be seen that for this method the order of axial section traversed for dressing a point on flank 30 will also be opposite that of dressing flank 32. That is, grinding section $Q_3$ will be dressed first followed by sections $Q_2$ and $Q_1$.

Once the point on grinding profile surface 30 is dressed along the grinding wheel width, the dressing tool will be located at end 26 and the dressing wheel rotation may again be reversed and the dressing tool positioned at point B on grinding surface 32 with dressing proceeding in the direction of arrow 44. This back-and-forth or bidirectional dressing of both grinding profile surfaces 32 and 30 eliminates return strokes that accompany unidirectional dressing and may reduce the amount of time necessary to completely dress the grinding wheel. Bidirectional dressing may be advantageous when dressing speeds of about 50–250 revolutions per minute (RPM) are utilized. If dressing speeds significantly faster than 250 RPM are used, it takes appreciable time to stop the rotation of the grinding wheel, reverse the direction of rotation, and get the grinding wheel back to the appropriate dressing speed. In this case, unidirectional dressing may be of an advantage since it may take less time to perform a return stroke than to reverse the direction of rotation of the grinding wheel.

It should be noted that the dressing method of the present invention may be performed on one or both grinding flank surfaces of a threaded grinding wheel. If the gear to be ground requires profile deviations on one tooth flank only, modifications may be necessary to just one flank of the grinding wheel thread. One example of this situation is when the gear will always be rotated in the same direction and therefore one of the tooth flanks will always be the drive-side of the tooth and the other tooth flank will always be the coast-side. The coast-side grinding flank may be dressed with a straight-line pressure angle profile along the wheel width to provide an involute surface on the coast-side work gear tooth flank. Of course, both flanks of the grinding surface in a grinding section may also be dressed with the same profile shape.

The present invention also contemplates dressing a desired number of grinding sections on one flank surface of the grinding thread and dressing a different number of grinding sections on the other flank surface of the grinding thread. Dressing a threaded grinding wheel in this manner would be necessary when a different number of tooth length profile deviations are desired for each flank of a work gear tooth or if deviations of different length are required on opposite tooth flanks.

If the number and width of grinding sections are the same for both flanks of the grinding thread, the same transition zones may be utilized regardless of the direction of dressing. However, if a different number or width of grinding sections are used for the grinding thread flanks, different transitions need to be established for each grinding thread flank.

It is to be understood that the top surface 34 and the root portion 36 of the grinding wheel 20 may be uniformly dressed along the width of the grinding wheel with the dressing tool 40 in accordance with established art-recognized practices if the root and/or the tops of the work gear teeth are to undergo grinding.

However, the principles of the present inventive method are applicable to the top 34 and root 36 in the same manner as described with respect to profile surfaces 32 and 30. For example, top surface 34 may be dressed to provide different root fillet radii along the tooth length of a work gear, or, root portion 36 may be dressed to provide tip relief along the length of the work gear teeth or different gear tip widths at each end of the teeth of a work gear. A plurality of successive points along the root or top of the grinding thread are each dressed in defined grinding wheel axial sections as outlined above to provide the grinding surfaces necessary to produce the desired top or root surfaces in the work gear.

FIG. 6 illustrates grinding a gear 2 with a threaded grinding wheel 20 dressed as described above. The grinding wheel 20 and the work gear 2 are rotated about their respective axes in a synchronous manner. The work gear 2 is then traversed along a path 46 tangentially across the width of the grinding wheel at an angle θ with respect to the axis 22 of the grinding wheel. The angle θ is dependent on the grinding wheel lead angle, work gear helix angle, work gear face width, and the width of the grinding wheel.

While the grinding wheel of the present invention has been discussed in terms of the grinding wheel being a dressable wheel, the axial grinding sections of the present invention may also be formed on those types of grinding wheels which need not be dressed. One type of non-dressable grinding wheel being plated cubic boron nitride (plated CBN) in which a steel form of the desired grinding wheel, including any number of axial grinding sections, is plated with CBN crystals.

FIGS. 7a, 7b, and 7c show the progression of contact along the tooth length of the work gear as the work gear is traversed across the width through sections $Q_1$, $Q_2$, and $Q_3$ of the grinding wheel 20 as shown in FIG. 6. Each work gear may be traversed across the width of a grinding wheel one or more times. FIG. 7a shows that in grinding section $Q_1$, a first portion of the tooth length $P_1$ is ground. The surface formed in $P_1$ being complementary to the surface dressed into section $Q_1$ in the dressing process discussed above.

As the work gear progresses along the path 46, it enters grinding section $Q_2$ where portion $P_2$ (FIG. 7b) is ground with the grinding surface previously dressed into section $Q_2$. Finally, the work gear enters grinding section $Q_3$ in which tooth length portion $P_3$ (FIG. 7c) undergoes grinding with the grinding surface dressed into the grinding surfaces of section $Q_3$.

It can be seen that by the grinding method of the present invention, contact between the grinding surfaces and the tooth surface shifts along the length of the work gear tooth surfaces as the gear is traversed tangentially along path 46. This enables the various surfaces dressed into the axial sections of the grinding wheel to each grind separate portions of the tooth length surface as the work gear is traversed along path 46. Each of the grinding sections $Q_1$, $Q_2$, and $Q_3$ is dressed with an appropriate surface that will produce desired tooth surface profile deviations along the length of a work gear tooth. When the work gear is traversed tangentially across the width of the grinding wheel, portions $P_1$, $P_2$, and $P_3$ of the tooth length engage the respective sections $Q_1$, $Q_2$, and $Q_3$ to form the desired profile deviations along the tooth length.

The present inventive method is not to be confused with the process known as lengthwise crowning. In lengthwise crowning the teeth of a work gear are modified, usually by removing more stock material at the ends of the teeth to produce a curvature along the length of the teeth thereby shifting contact away from the tooth edges. However, lengthwise crowning does not effect the profile shape of the tooth surfaces. The involute shape of the tooth profile exists along the entire length of a tooth that has undergone lengthwise crowning. The present profile deviation process may be performed on lengthwise crowned tooth surfaces, or, may be carried out in conjunction with those machine motions necessary to produce lengthwise crowning on work gear teeth.

Figure 8:
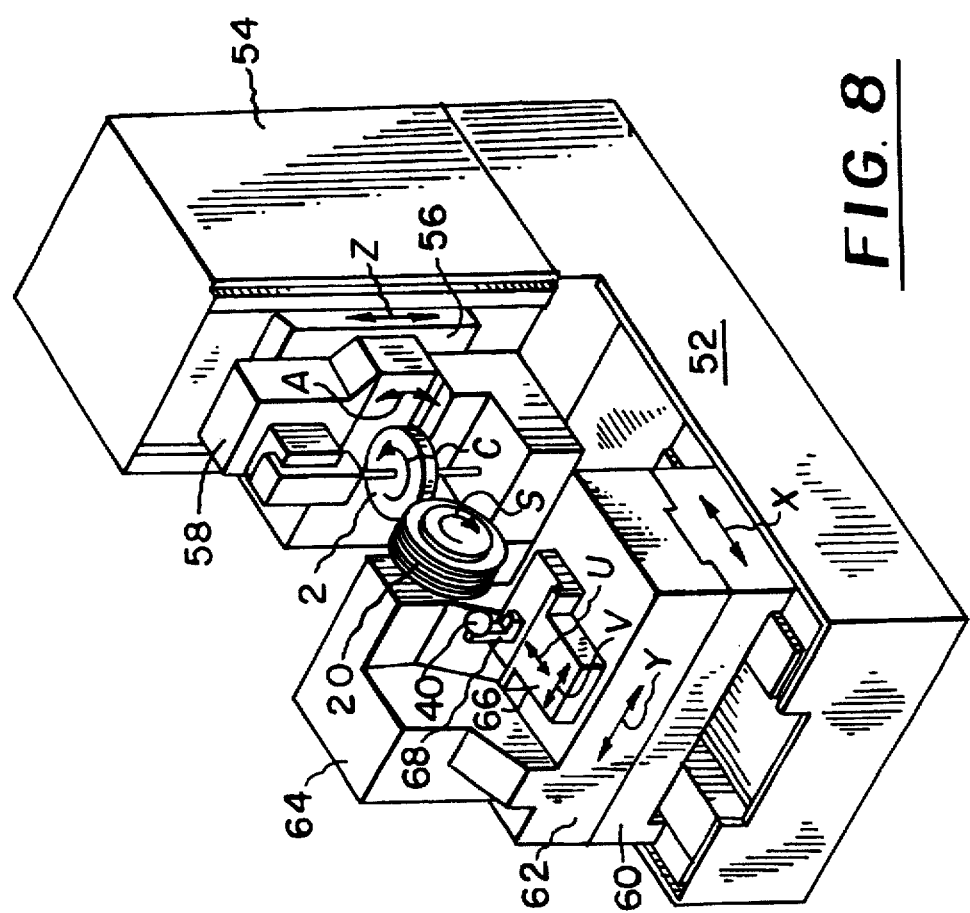
FIG. 8 schematically illustrates a machine for carrying out the inventive dressing and grinding methods.

FIG. 8 illustrates a computer controlled machine 50 for carrying out the inventive dressing and grinding methods. Machines of this type are known in the art and are readily available.

The machine includes a base 52 and a work column 54. A work table slide 56 is arranged on the work column 54 for linear movement along an axis (Z-axis). Mounted for rotation to work table slide 56 is work support 58 which is rotatable about an axis (A-axis) for setting the proper helix angle required for grinding a particular gear. A work gear 2 is mounted to work support 58 by appropriate work holding equipment for rotation about the work gear axis (C-axis).

Also located on base 52 are a pair of tool slides 60 and 62. Tool slide 60 enables movement of the tool along the length of the base (X-axis) and tool slide 62 enables movement of the tool across the width of the base (Y-axis). Machine axes X, Y, and Z are mutually perpendicular to one another. Attached to tool slide 62 is tool support 64 to which tool 20 is mounted for rotation about a tool axis (S-axis).

A dressing wheel table 66 is located on tool slide 62 and is movable along perpendicular dressing axes (U-axis and V-axis). A dressing tool support 68 is mounted to dressing wheel table 66 and a rotary dressing tool 40 is mounted for rotation to dressing tool support 68. Dressing tool support 68 is angularly adjustable on table 66 in order to position the dressing tool 40 to the lead angle of the grinding wheel 20. V-axis motion is utilized to traverse the dressing tool 40 along the width of the grinding wheel 20 and U-axis motion is used for infeeding of the dressing tool to position the dressing tool 40 at each contact point (A–J in FIG. 3, for example) along the profile of the grinding thread surface.

Movement about or along the described axes is imparted by separate drive motors (not shown). The movable machine components named above are capable of independent movement with respect to one another and may move simultaneously with one another. Each of the respective motors is associated with either a linear or rotary encoder (not shown) as part of a computer numerical control (CNC) system which governs the operation of the drive motors in accordance with instructions input to a computer (not shown). The encoders provide feedback information to the computer concerning the actual positions of each of the movable axes.

The present invention enables enhanced control of the tooth surface of a work gear by providing a method of dressing a threaded grinding wheel by controlling the grinding surface profile shape along the width of the grinding wheel whereby any number of desired tooth flank profile deviations may be formed along the tooth length of the work gear during grinding.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of dressing a threaded grinding wheel, said grinding wheel comprising an axis of rotation, a width extending in the direction of said axis of rotation, and at least one ribbed grinding surface having two flank surfaces, a top surface and a root portion with said ribbed grinding surface being generally helically arranged about said grinding wheel and extending along said width, said method comprising:

assigning a plurality of axial sections along the width of said grinding wheel, rotating said grinding wheel about said axis of rotation, contacting a point on one flank of said at least one grinding rib with a rotating dressing tool, traversing said dressing tool through said axial sections along the width of said grinding wheel, said dressing tool maintaining contact with said point during said traversing to remove stock material at said point on said flank along the width of the grinding wheel, controlling the amount of stock material removed during said traversing at said point in each of said axial sections whereby different amounts of stock may be removed in each of said axial sections at said point.

2. The method of claim 1 further comprising:

repeating said steps of contacting, traversing, and controlling for successive points along said flank of said grinding thread whereby a particular grinding flank profile surface is formed in each of said axial sections.

3. The method of claim 2 further comprising:

performing the steps of contacting, traversing, controlling and repeating for the other of said two flanks of said grinding surface.

4. The method of claim 3 wherein both the flank surface profiles of the grinding surface in an axial section are the same.

5. The method of claim 3 wherein the flank surface profiles of the grinding surface in an axial section are different.

6. The method of claim 1 further comprising:

reversing the direction of rotation of said grinding wheel, and, performing the steps of contacting, traversing, and controlling for a point on the other grinding surface flank, wherein the traversing for said other flank is in a direction opposite that for said one flank.

7. The method of claim 6 wherein all successive points along said one and said other grinding flanks are dressed by the steps of contacting, traversing and controlling with the direction of rotation of the grinding wheel and the direction of traversal of said dressing tool being reversed for each traversal of the dressing tool along the width of said grinding wheel.

8. The method of claim 7 wherein both the flank surface profiles of the grinding surface in an axial section are the same.

9. The method of claim 7 wherein the flank surface profiles of the grinding surface in an axial section are different.

10. The method of claim 1 wherein said dressing tool is a generally disk-shaped tool with a predetermined edge radius.

11. The method of claim 1 wherein said tool is diamond plated.

12. The method of claim 1 wherein the number of said axial sections corresponds to a like number of desired profile surfaces arranged across the face of a gear tooth to be ground by the dressed threaded grinding wheel.

13. The method of claim 1 wherein with different amounts of stock material being removed at said point in adjacent axial sections, said dressing tool is repositioned to remove a predetermined amount of stock material in each adjacent axial section at said point, said repositioning being effected in a transition zone located between adjacent axial sections whereby said dressing tool is repositioned from said point in one axial section to said point in the next axial section while traversing through said transition zone.

14. The method of claim 13 wherein said repositioning is effected in a linear manner in said transition zone.

15. A threaded grinding wheel comprising an axis of rotation and a width extending along said axis of rotation, said grinding wheel including at least one ribbed grinding surface having two flank surfaces, a top surface and a root portion with said ribbed grinding surface being generally helically arranged about said grinding wheel and extending along said width, said grinding wheel comprising:

a plurality of axial sections located along the width of said grinding wheel, each of said axial sections comprising a particular grinding surface profile for machining a desired profile surface along the length of a work gear tooth surface wherein each axial section comprises a grinding surface profile different than the grinding surface profile of an adjacent axial section.

16. The grinding wheel of claim 15 wherein the grinding flank surfaces in an axial section have the same surface profile.

17. The grinding wheel of claim 15 wherein the grinding flank surfaces in an axial section have different surface profiles.

18. The grinding wheel of claim 15 further including a transition zone located between each of said axial sections whereby a smooth transition between said axial sections is provided.

19. The grinding wheel of claim 15 wherein said grinding wheel is non-dressable.

* * * * *